US012086713B2

(12) United States Patent
De Freitas Adiwardana et al.

(10) Patent No.: US 12,086,713 B2
(45) Date of Patent: Sep. 10, 2024

(54) EVALUATING OUTPUT SEQUENCES USING AN AUTO-REGRESSIVE LANGUAGE MODEL NEURAL NETWORK

(71) Applicant: Google LLC, Mountain View, CA (US)

(72) Inventors: Daniel De Freitas Adiwardana, Mountain View, CA (US); Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/876,451

(22) Filed: Jul. 28, 2022

(65) Prior Publication Data

US 2023/0029590 A1 Feb. 2, 2023

Related U.S. Application Data

(60) Provisional application No. 63/226,748, filed on Jul. 28, 2021.

(51) Int. Cl.

*G06N 3/08* (2023.01)
*G06F 18/2113* (2023.01)
*G06N 20/00* (2019.01)

(52) U.S. Cl.

CPC ........... *G06N 3/08* (2013.01); *G06F 18/2113* (2023.01); *G06N 20/00* (2019.01)

(58) Field of Classification Search

CPC ........... G06N 3/08; G06N 20/00; G06K 9/623
See application file for complete search history.

(56) References Cited

U.S. PATENT DOCUMENTS

| | | | | |
|---|---|---|---|---|
| 11,487,522 | B1 * | 11/2022 | Singh | G06F 8/52 |
| 2012/0131031 | A1 | 5/2012 | Xie et al. | |
| 2019/0130267 | A1 | 5/2019 | Norouzi et al. | |
| 2019/0362229 | A1 | 11/2019 | Norouzi et al. | |
| 2020/0151544 | A1 * | 5/2020 | Chiu | G06N 3/08 |
| 2020/0356625 | A1 * | 11/2020 | Tater | G06F 40/226 |
| 2021/0110831 | A1 | 4/2021 | Shillingford et al. | |
| 2021/0151031 | A1 * | 5/2021 | Choo | G10L 15/22 |
| 2022/0138559 | A1 * | 5/2022 | Gangi Reddy | G06F 40/35 706/25 |

FOREIGN PATENT DOCUMENTS

JP 2021064390 A 4/2021

OTHER PUBLICATIONS

Wang, Chenglong, et al. "Robust text-to-sql generation with execution-guided decoding." arXiv preprint arXiv:1807.03100 (2018). (Year: 2018).*

(Continued)

*Primary Examiner* — Michael J Huntley
*Assistant Examiner* — Sehwan Kim
(74) *Attorney, Agent, or Firm* — Fish & Richardson P.C.

(57) ABSTRACT

Methods, systems, and apparatus, including computer programs encoded on computer storage media, for evaluating candidate output sequences using language model neural networks. In particular, an auto-regressive language model neural network is used to generate a candidate output sequence. The same auto-regressive language model neural network is used to evaluate the candidate output sequence to determine rating scores for each of one or more criteria. The rating score(s) are then used to determine whether to provide the candidate output sequence.

21 Claims, 5 Drawing Sheets

(56) References Cited

OTHER PUBLICATIONS

Çetinkaya, Yusuf Mücahit, İsmail Hakk Toroslu, and Hasan Davulcu. "Developing a Twitter bot that can join a discussion using state-of-the-art architectures." Social network analysis and mining 10.1 (2020): 1-21. (Year: 2020).*
Baccouche, Asma, Begonya Garcia-Zapirain, and Adel Elmaghraby. "Annotation technique for health-related tweets sentiment analysis." 2018 IEEE international symposium on signal processing and information technology (ISSPIT). IEEE, 2018. (Year: 2018).*
Jhamtani, Harsh, et al. "Shakespearizing modern language using copy-enriched sequence-to-sequence models." arXiv preprint arXiv:1707.01161 (2017). (Year: 2017).*
Katharopoulos, Angelos, et al. "Transformers are rnns: Fast autoregressive transformers with linear attention." International conference on machine learning. PMLR, 2020. (Year: 2020).*
Abid et al., "Persistent Anti-Muslim Bias in Large Language Models," Proceedings of the 2021 AAAI/ACM Conference on AI, Ethics, and Society, Jul. 2021, pp. 298-306.
Adiwardana et al., "Towards a Human-like Open-Domain Chatbot," arXiv, Feb. 27, 2020, 38 pages.
ai.googleblog.com [online], "A Scalable Approach to Reducing Gender Bias in Google Translate," Apr. 22, 2020, retrieved on Aug. 10, 2022, retrieved from URL<https://ai.googleblog.com/2020/04/a-scalable-approach-to-reducing-gender.html>, 4 pages.
Basta et al., "Evaluating the underlying gender bias in contextualized word embeddings," Proceedings of the First Workshop on Gender Bias in Natural Language Processing, Aug. 2019, pp. 33-39.
Bender et al., "On the dangers of stochastic parrots: Can language models be too big?" Proceedings of the 2021 ACM Conference on Fairness, Accountability, and Transparency, Mar. 2021, pp. 610-623.
Bolukbasi et al., "Man is to Computer Programmer as Woman is to Homemaker? Debiasing Word Embeddings," Advances in Neural Information Processing Systems, 2016, 9 pages.
Bordia et al., "Identifying and reducing gender bias in word-level language models," arXiv, Apr. 5, 2019, 12 pages.
Brown et al., "Language models are few-shot learners," Advances in Neural Information Processing Systems, 2020, 25 pages.
Carlini et al., "Extracting training data from large language models," arXiv, Dec. 14, 2020, 21 pages.
Dai et al., "Semi-supervised sequence learning," Advances in Neural Information Processing Systems, 2015, 9 pages.
Devlin et al., "BERT: Pre-training of Deep Bidirectional Transformers for Language Understanding," arXiv, May 24, 2019, 16 pages.
Dinan et al., "Queens are powerful too: Mitigating gender bias in dialogue generation," arXiv, Apr. 16, 2020, 14 pages.
Dinan et al., "The Second Conversational Intelligence Challenge (ConvAI2)," The NeurIPS '18 Competition, 2020, pp. 187-208.
Dinan et al., "Wizard of Wikipedia: Knowledge-powered conversational agents," arXiv, Feb. 21, 2019, 18 pages.
Garg et al., "Counterfactual Fairness in Text Classification through Robustness," Proceedings of the 2019 AAAI/ACM Conference on AI, Ethics, and Society, Jan. 2019, pp. 219-226.
Gehman et al., "RealToxicityPrompts: Evaluating neural toxic degeneration in language models," arXiv, Sep. 25, 2020, 25 pages.
Guo et al., "Detecting Emergent Intersectional Biases: Contextualized Word Embeddings Contain a Distribution of Human-like Biases," Proceedings of the 2021 AAAI/ACM Conference on AI, Ethics, and Society, Jul. 2021, pp. 122-133.
Henderson et al., "Ethical Challenges in Data-Driven Dialogue Systems," Proceedings of the 2018 AAAI/ACM Conference on AI, Ethics, and Society, Dec. 2018, pp. 123-129.
Howard et al., Universal Language Model Fine-tuning for Text Classification, arXiv, May 23, 2018, 12 pages.
Huang et al., Reducing Sentiment Bias in Language Models via Counterfactual Evaluation, arXiv, Oct. 8, 2020, 19 pages.
Hutchinson et al., "Social biases in NLP models as barriers for persons with disabilities," arXiv, May 2, 2020, 11 pages.
Jozefowicz et al., "Exploring the limits of language modeling," arXiv, Feb. 11, 2016, 11 pages.
Kaplan et al., "Scaling laws for neural language models," arXiv, Jan. 23, 2020, 30 pages.
Keskar et al., "CTRL: A conditional transformer language model for controllable generation," arXiv, Sep. 20, 2019, 18 pages.
Khandelwal et al., "Generalization through memorization: Nearest neighbor language models," arXiv, Nov. 1, 2019, 13 pages.
Kiros et al., "Skip-thought vectors," Advances in Neural Information Processing Systems, 2015, 9 pages.
Kudo et al., "SentencePiece: A simple and language independent subword tokenizer and detokenizer for neural text processing," arXiv, Aug. 19, 2018, 6 pages.
Kurita et al., "Measuring bias in contextualized word representations," arXiv, Jun. 18, 2019, 7 pages.
Levesque, "The winograd schema challenge," Proceedings of the Thirteenth International Conference on Principles of Knowledge Representation and Reasoning, Jun. 2012, pp. 552-561.
Lewis et al., "Retrieval-Augmented Generation for Knowledge-Intensive NLP Tasks," Advances in Neural Information Processing Systems, 2020, 16 pages.
Li et al., "A diversity-promoting objective function for neural conversation models," arXiv, Oct. 11, 2015, 10 pages.
Li et al., "Acute-eval: Improved dialogue evaluation with optimized questions and multi-turn comparisons," arXiv, Sep. 6, 2019, 11 pages.
Li et al., "Recipes for safety in open-domain chatbots," arxiv, Oct. 22, 2020, 28 pages.
Liang et al., "Towards debiasing sentence representations," arXiv, Jul. 16, 2020, 14 pages.
Liang et al., "Towards understanding and mitigating social biases in language models," Proceedings of the 38th International Conference on Machine Learning, 2021, 12 pages.
Liu et al., "Does gender matter? Towards fairness in dialogue systems," arXiv, Oct. 16, 2019, 12 pages.
Liu et al., "How Not to evaluate your dialogue system: An empirical study of unsupervised evaluation metrics for dialogue response generation," arXiv, Mar. 25, 2016, 13 pages.
Liu et al., "On-the-fly controlled text generation with experts and anti-experts," arXiv, May 7, 2021, 15 pages.
Liu et al., "RoBERTa: A robustly optimized BERT pretraining approach," arXiv, Jul. 26, 2019, 13 pages.
May et al., "On measuring social biases in sentence encoders," arXiv, Mar. 25, 2019, 12 pages.
McGuffie et al., "The radicalization risks of GTP-3 and advanced neural language models," arXiv, Sep. 15, 2020, 12 pages.
Mikolov et al., "Recurrent neural network based language model," Jul. 20, 2010, 24 pages.
Novikova et al., "Why we need new evaluation metrics for NLG," arXiv, Jul. 21, 2017, 17 pages.
Papineni et al., "BLEU: A method for automatic evaluation of machine translation," Proceedings of the 40th Annual Meeting of the Association for Computational Linguistics (ACL), Jul. 2002, pp. 311-318.
Patterson et al., "Carbon emissions and large neural network training," arXiv, Apr. 23, 2021.
Peters et al., "Deep contextualized word representations," arXiv, Mar. 22, 2018, 15 pages.
Prabhakaran et al., "Perturnation sensitivity analysis to detect unintended model biases," arXiv, Oct. 9, 2019, 6 pages.
Qian et al., "Reducing gender bias in word-level language models with a gender-equalizing loss function," arXiv, Jun. 3, 2019, 6 pages.
Radford et al., "Improving language understanding by generative pre-training," 2018, 12 pages.
Radford et al., "Unsupervised representation learning with deep convolutional generative adversarial networks," arXiv, Jan. 7, 2016, 16 pages.
Raffel et al., "Exploring the limits of transfer learning with a unified text-to-text transformer," arXiv, Oct. 24, 2019, 53 pages.
Raffel et al., "Exploring the limits of transfer learning with a unified text-to-text transformer," Journal of Machine Learning Research, Jun. 2020, 67 pages.

(56) References Cited

OTHER PUBLICATIONS

Roller et al., “Recipes for building an open-domain chatbot,” arXiv, Apr. 30, 2020, 25 pages.
Rosalie Gascoigne: A catalogue raisonne, Martin Gascoigne, 2019, 445 pages.
Sap et al., “Social bias frames: Reasoning about social and power implications of language,” arXiv, Apr. 23, 2020, 14 pages.
Sap et al., “The risk of racial bias in hate speech detection,” Proceedings of the 57th Annual Meeting of the Association for Computational Linguistics, Jul. 2019, pp. 1668-1678.
See et al., “What makes a good conversation? How controllable attributes affect human judgments,” arXiv, Apr. 10, 2019, 22 pages.
Senrich et al., “Neural machine translation of rare words with subword units,” arXiv, Nov. 17, 2015, 11 pages.
Serban et al., “Generative deep neural networks for dialogue: A short review,” arXiv, Nov. 18, 2016, 6 pages.
Shang et al., “Neural responding machine for short-text conversation,” arXiv, Apr. 27, 2015, 12 pages.
Shazeer, “Glu variants improve transformer,” arXiv, Feb. 12, 2020, 5 pages.
Shen et al., “Lingvo: A modular and scalable framework for sequence-to-sequence modeling,” arXiv, Feb. 21, 2019, 17 pages.
Sheng et al., “The woman worked as a babysitter: On biases in language generation,” arXiv, Oct. 23, 2019, 8 pages.
Shuster et al., “Retrieval augmentation reduces hallucination in conversation,” arXiv, Apr. 15, 2021, 21 pages.
Solaiman et al., “Process for adapting language models to society (PALMS) with values-targeted datasets,” Advances in Neural Information Processing Systems, 2021, 13 pages.
Sordoni et al., “A neural network approach to context-sensitive generation of conversational responses,” arXiv, Jun. 22, 2015, 11 pages.
Sutskever et al., “Generating text with recurrent neural networks,” Proceedings of the 28th International Conference on Machine Learning, 2011, 8 pages.
Vaswani et al., “Attention is all you need,” Advances in Neural Information Processing Systems, 2017, 11 pages.
Venkatesh et al., “On evaluating and comparing conversational agents,” Presented at 31st Conference on Neural Information Processing Systems (NIPS 2017), Long Beach, CA, USA, Dec. 4-9, 2017, 10 pages.
Vinyals et al., “A neural conversational model,” arXiv, Jul. 22, 2015, 8 pages.
wikipedia.com [online], “Joan Miro,” 2021, retrieved on Aug. 10, 2022, retrieved from URL<https://en.wikipedia.org/wiki/Joan_Mir%C3%B3>, 16 pages.
Wolf et al., “Transfertransfo: A transfer learning approach for neural network based conversational agents,” arXiv, Feb. 4, 2019, 6 pages.
Xu et al., “Bot-adversarial dialogue for safe conversational agents,” Proceedings of the 2021 Conference of the North American Chapter of the Association for Computational Linguistics: Human Language Technologies, Jun. 2021, pp. 2950-2968.
Xu et al., “GSPMD: General and scalable parallelization for ML computation graphs,” arXiv, Dec. 23, 2021, 16 pages.
Yang et al., “XLNet: Generalized autoregressive pretraining for language understanding,” Advances in Neural Information Processing Systems , 2019, 11 pages.
Zhang et al., “Dialogpt: Large-scale generative pre-training for conversational response generation,” arXiv, Nov. 1, 2019, 10 pages.
Zhang et al., “Hurtful words: Quantifying biases in clinical contextual word embeddings,” Proceedings of the ACM Conference on Health, Inference, and Learning, Apr. 2020, pp. 110-120.
Zhang et al., “Personalizing dialogue agents: I have a dog, do you have pets too?” arXiv, Sep. 25, 2018, 16 pages.
Zhao et al., “Gender bias in contextualized word embeddings,” Proceedings of the 2019 Conference of the North American Chapter of the Association for Computational Linguistics: Human Language Technologies, Jun. 2019, pp. 629-634.
International Search Report and Written Opinion in International Appln. No. PCT/US2022/038742, mailed Nov. 25, 2022, 10 pages.

* cited by examiner

EVALUATING OUTPUT SEQUENCES USING AN AUTO-REGRESSIVE LANGUAGE MODEL NEURAL NETWORK

CROSS-REFERENCE TO RELATED APPLICATION

This application claims the benefit of U.S. Provisional Application No. 63/226,748, filed on Jul. 28, 2021. The disclosure of the prior application is considered part of and is incorporated by reference in the disclosure of this application.

BACKGROUND

This specification relates to processing inputs using neural networks to generate output sequences.

Neural networks are machine learning models that employ one or more layers of nonlinear units to predict an output for a received input. Some neural networks include one or more hidden layers in addition to an output layer. The output of each hidden layer is used as input to the next layer in the network, i.e., another hidden layer or the output layer. Each layer of the network generates an output from a received input in accordance with current values of a respective set of parameters.

SUMMARY

This specification describes a system implemented as computer programs on one or more computers in one or more locations that generates output sequences using an auto-regressive language model neural network and then evaluates the output sequences using the same auto-regressive language model neural network, i.e., in order to determine whether the output sequences are suitable for providing as the output of the system or to select which output sequence should be provided in response to a given request. Thus, the system uses the same auto-regressive neural network both to generate the sequences and to "discriminate" between the generated sequences to determine which sequence, if any, to provide in response to a given request.

The subject matter described in this specification can be implemented in particular embodiments so as to realize one or more of the following advantages.

The described techniques allow an auto-regressive language model neural network to be used as both a generator and a discriminator, i.e., to be used both to generate an output sequence and to evaluate how well that output sequence satisfies one or more criteria.

Relative to having separate generator and discriminator models, having a single model that can function as both a generator and a discriminator allows for candidate outputs to be evaluated accurately with minimal additional computational overhead relative to generating the candidates. That is, the system can evaluate generated sequences with much less additional latency and while consuming much less additional memory relative to evaluating the sequences using a separate generator model.

For example, in some cases the language model neural network can be deployed on a device with a constrained memory space, i.e., that has significant constraints on available memory, or on a device where low decoding latency is required, e.g., on edge devices such as mobile devices, smart speakers, or other Internet of Things (IoT) devices or embedded with a robot or other physical system. In these cases, the system can evaluate sequences generated by the neural network on-device with minimal additional computational overhead, allowing for the quality of the output sequences that are provided in response to received requests to be improved while still performing the processing on-device and without requiring additional data communication over a network. That is, because the language model neural network is used as both the generator and the discriminator, the edge device can perform the evaluation locally on-device without exceeding memory or latency constraints.

Moreover, this single model can be used to filter task-specific fine-tuning data before the filtered data is used to fine-tune the model to perform well on a specific task. After the fine-tuning, the quality of the output sequences generated by the language model neural network can be significantly increased because the language model has been fine-tuned on training data without a significant amount of sub-standard outputs.

The details of one or more embodiments of the subject matter of this specification are set forth in the accompanying drawings and the description below.

Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
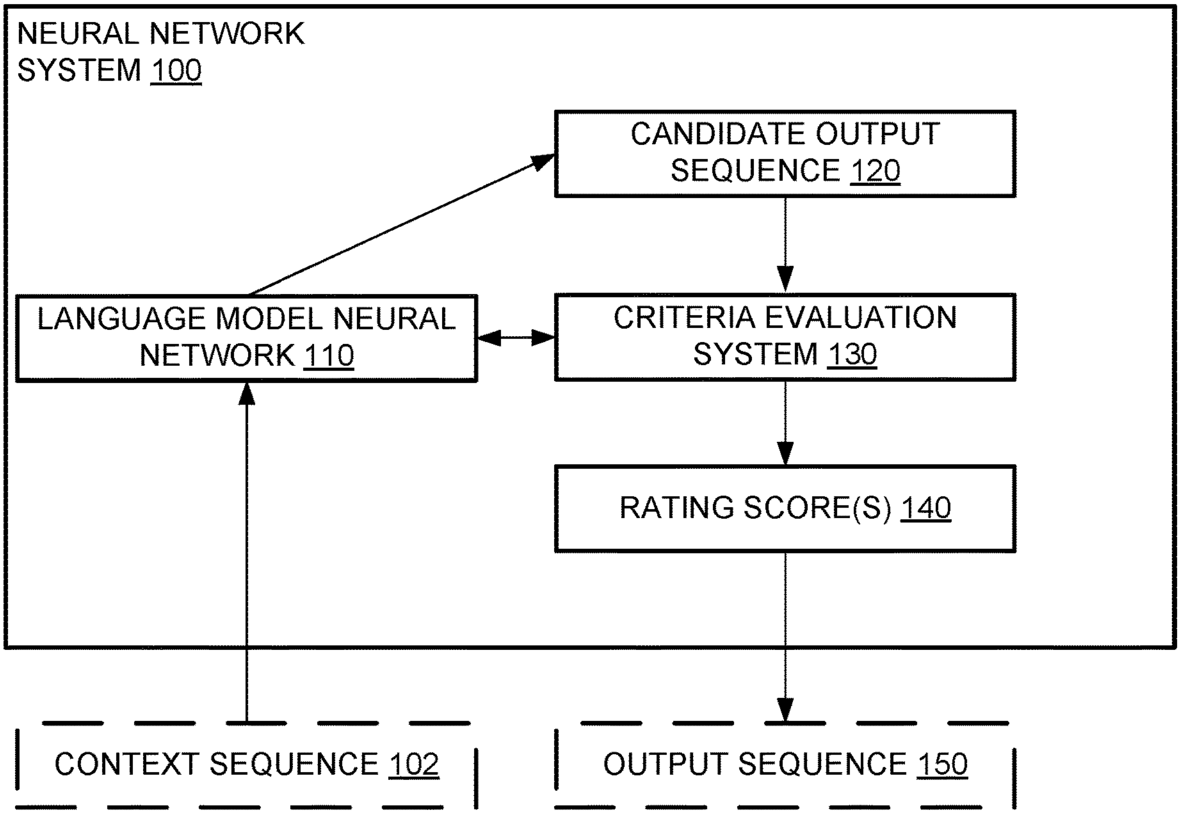
FIG. 1 is a diagram of an example neural network system.

FIG. 1 is a diagram of an example neural network system 100. The neural network system 100 is an example of a system implemented as computer programs on one or more computers in one or more locations, in which the systems, components, and techniques described below can be implemented.

The neural network system 100 is a system that generates output sequences 150 in response to received requests.

For example, the system 100 can be an output sequence generation system that generates output sequences 150 unprompted, i.e., without conditioning on any user-specified context input. In these implementations, the output sequences generated by the system 100 approximate samples of a distribution of training output sequences that were using during the training of the system 100.

As an example, the system 100 can be a text generation system that generates text sequences, i.e., each output sequence 150 generated by the system 100 is a sequence of text tokens from a vocabulary of text tokens that includes, e.g., one or more of characters, sub-words, words, punctuation marks, numbers, or other symbols that appear in natural language text. For example, the system 100 can generate text sequences in response to received requests and provide the text sequences for presentation to users.

As another example, the system 100 can be an image generation system that generates images as sequences of pixels, i.e., each output sequence 150 generated by the system 100 is a sequence of color values for pixels in an output image arranged according to a specified order.

As another example, the system 100 can receive a context sequence 102 as part of the request and generate an output sequence 150 that is a response to the context sequence 102.

As a particular example, the system 100 can be part of a dialog system and the context sequence 102 can include audio or text from the most recent conversational turn submitted by a user of the dialog system during the dialog while the output sequence 150 is the next turn in the conversation, e.g., either text or audio that is a response to the most recent conversational turn. Optionally, the context sequence 102 can also include one or more historical conversational turns that occurred earlier in the conversation.

As another particular example, the system 100 can be part of a machine translation system and the context sequence 102 can include text in a source language while the output sequence 150 is text in a target language that is a translation of the source text into the target language.

As another particular example, the system 100 can be part of a computer code generation system and the context sequence 102 can be a text description of a desired piece of code or a snippet of computer code in a programming language and the output sequence 150 can be computer code, e.g., a snippet of code that is described by the context sequence 102 or a snippet of code that follows the context sequence 102 in a computer program.

More specifically, the system 100 receives a request for an output sequence 150 and, in response, generates one or more candidate output sequences 120 using an auto-regressive language model neural network 110, i.e., either unconditioned or conditioned on the context sequence 102.

Each candidate output sequence 120 includes a respective token from a vocabulary of tokens at each of multiple positions. The vocabulary of tokens can include any of a variety of tokens that represent text symbols or other symbols. For example, the vocabulary of tokens can include one or more of characters, sub-words, words, punctuation marks, numbers, or other symbols that appear in a corpus of natural language text.

The language model neural network 110 is referred to as an auto-regressive neural network because the neural network 110 auto-regressively generates an output sequence of tokens by generating each particular token in the output sequence conditioned on a current input sequence that includes any tokens that precede the particular text token in the output sequence, i.e., the tokens that have for already been generated for any previous positions in the output sequence that precede the particular position of the particular token. When the system 100 also receives the context sequence 102, the current input sequence can also include the context sequence 102. For example, the current input sequence when generating a token at any given position in the output sequence can include the context sequence 102 and the tokens at any preceding positions that precede the given position in the output sequence. As a particular example, the current input sequence can include the context sequence 102, followed by a "sentinel" sequence that represents a predetermined sequence of tokens that indicates to the neural network 110 that a response to the context sequence 102 should be generated, and followed by the tokens at any preceding positions that precede the given position in the output sequence. Optionally, subsequences can be separated by predetermined tokens, e.g., the "<" and ">" tokens, within the current input sequence.

More specifically, to generate a particular token at a particular position within a candidate output sequence 120, the neural network 110 can process the current input sequence to generate a score distribution, e.g., a probability distribution, that assigns a respective score, e.g., a respective probability, to each token in the vocabulary of tokens. The neural network 110 can then select, as the particular token, a token from the vocabulary using the score distribution. For example, the neural network 110 can greedily select the highest-scoring token or can sample, e.g., using nucleus sampling or another sampling technique, a token from the distribution.

As a particular example, the language model neural network 110 can be an auto-regressive Transformer-based neural network that includes (i) a plurality of attention blocks that each apply a self-attention operation and (ii) an output subnetwork that processes an output of the last attention block to generate the score distribution.

The neural network 110 can have any of a variety of Transformer-based neural network architectures. Examples of such architectures include those described in Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv:1910.10683, 2019; Daniel Adiwardana, Minh-Thang Luong, David R. So, Jamie Hall, Noah Fiedel, Romal Thoppilan, Zi Yang, Apoory Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv:2005.14165, 2020.

Generally, however, the Transformer-based neural network includes a sequence of attention blocks, and, during the processing of a given input sequence, each attention block in the sequence receives a respective input hidden state for each input token in the given input sequence. The attention block then updates each of the hidden states at least in part by applying self-attention to generate a respective output hidden state for each of the input tokens. The input hidden states for the first attention block are embeddings of the input tokens in the input sequence and the input hidden states for each subsequent attention block are the output hidden states generated by the preceding attention block.

In this example, the output subnetwork processes the output hidden state generated by the last attention block in the sequence for the last input token in the input sequence to generate the score distribution.

In some implementations, the system 100 or another training system pre-trains the language model neural network 110 on a language modeling task, e.g., a task that requires predicting, given a current sequence of text tokens, the next token that follows the current sequence in the training data. As a particular example, the language model neural network 110 can be pre-trained on a maximum-likelihood objective on a large dataset of text, e.g., text that is publically available from the Internet or another text corpus.

Generally, because the neural network 110 is auto-regressive, the system 100 can use the same neural network 110 to generate multiple different candidate output sequences 120 in response to the same request, e.g., by using beam search decoding from score distributions generated by the neural network 110, using a Sample-and-Rank decoding strategy, or using another decoding strategy that leverages the auto-regressive nature of the neural network.

When multiple candidate output sequences 120 are generated, the system 100 needs to determine which of the multiple sequences to provide as the output sequence 150 in response to the request. Moreover, even if only a single output sequence is generated, some candidate output sequences 120 are not suitable as being provided as the final output sequence 150.

To determine how to respond to a given request, i.e., to determine which candidate output sequence 120, if any, to provide in response to the request, the system 100 maintains data specifying a set of one or more criteria ("output sequence criteria") that each measure a corresponding property of a given output sequence.

The set of criteria can include any of a variety of criteria that measure properties that are relevant to the quality of a given candidate output sequence in terms of the task that the system 100 is configured to perform.

For example, the set of criteria can include a criterion that corresponds to the sensibleness of the output sequence. The sensibleness criterion measures whether the model's responses are sensible, i.e., whether a given candidate output sequence generated by the neural network 110 makes sense in the context of the current interaction, i.e., as a response to the context sequence 102, and does not contradict any information in the context sequence 102 or in earlier sequences during the current interaction. Thus, an output sequence satisfies this criterion if the output sequence is sensible.

As another example, the set of criteria can include a criterion that corresponds to the specificity of the output sequence. The specificity criterion measures whether the model's responses are specific, i.e., whether a given candidate output sequence generated by the neural network 110 is specific to the corresponding context sequence 102 as opposed to being a generic response that could apply to any of variety of context sequences. For example, if the context sequence 102 is "I love television" and the model responds "Me too," this would receive a low score, e.g., a score of 0, on specificity, since this response could be used in many different contexts. If the model responds "Me too. I love watching reality shows," then it would score higher on specificity.

As another example, the set of criteria can include a criterion that corresponds to the interestingness of the output sequence. The interestingness criterion measures whether the model's responses are interesting, i.e., whether a given candidate output sequence generated by the neural network 110 would be interesting to a human that generated the corresponding context sequence 102. For example, a response to "How do I throw a ball?" could be "You can throw a ball by first picking it up and then throwing it." An alternative, more interesting answer could be "One way to toss a ball is to hold it firmly in both hands and then swing your arm down and up again, extending your elbow and then releasing the ball upwards." While the initial response makes sense and is specific to the question, it will likely not be found to be interesting or informative to a person that posed the question. The alternative response, on the other hand, provides additional information that answers the question and would therefore score higher on the interestingness criterion than the initial response.

Other criteria can be included instead of or in addition to the above criteria. For example, the other criteria can include a suitability criterion that measures the degree to which a given output sequence is suitable for being provided in response to the request.

The system 100 uses a criteria evaluation system 130 to generate a respective rating score 140 for each of the one or more criteria in the set. The rating score 140 for a given criterion measures the degree to which the candidate output sequence 120 generated by the auto-regressive language model neural network 110 satisfies the criterion.

Generally, the criteria evaluation system 130 uses outputs from the language model neural network 110 to generate the rating scores 140 in a computationally-efficient but accurate manner.

Example techniques for making use of the neural network 110 to generate rating scores 140 for one or more criteria in the set will be described below with reference to FIGS. 2-5.

That is, rather than using only a separately-trained machine learning model to generate the rating scores 140, the system 130 leverages the neural network 110 to improve both the accuracy of the rating scores 140 and the computational efficiency of generating the rating scores 140.

Once the rating scores 140 are generated, the system 100 can determine whether to provide the candidate output sequence 120 using the rating scores 140 in response to the request in any of a variety of ways.

For example, in implementations where the system 100 generates multiple candidate output sequences, the system 100 can generate, for each of the candidate output sequences, a respective quality score from the respective rating scores 140 for the candidate output sequence for one or more of the criteria in the set. For example, the quality score for a given candidate output sequence can be a sum or a weighted sum of the rating scores 140 for the one or more criteria.

The system 100 can then select, as the sequence to be provided in response to the request, the candidate output sequence 120 with the highest respective quality score.

As another example, the system 100 can maintain a respective threshold value for at least a subset of the criteria. In this example, for each criterion in the subset, the system 100 can determine, for a given candidate output sequence 120, whether the respective rating score for the given candidate output sequence for the criterion in the set satisfies, e.g., exceeds, the threshold value for the criterion and then determine not to provide the given candidate output sequence in response to the request when the respective rating score for the given candidate output sequence for the first output criterion in the set does not satisfy the threshold (even if the given candidate output sequence would otherwise have the highest quality score).

In addition to or instead of using the system 130 to determine how to respond to requests, the system 100 can also use the system 130 to filter task-specific fine-tuning data before the filtered data is used to fine-tune the neural network 110 to perform well on a specific task.

In particular, the system 100 can obtain task-specific fine-tuning data that includes a set of training output sequences and, optionally, a corresponding context sequence for each training output sequences. The system 130 can then generate rating scores for each of the training output sequences and then filter one or more training output sequences out of the fine-tuning data using the rating scores. For example, the system 130 can determine to filter out any training output sequence that has a quality score that is lower than a threshold value. As another example, the system 130 can determine to filter out any training output sequence that has, for each criterion in a designated subset of the criteria, a rating score that is below another threshold value. By filtering out these training output sequences, the system improves the overall quality of the output sequences in the fine-tuning data and, therefore, after the fine-tuning, the quality of the output sequences generated by the language model neural network 110 can be significantly increased.

Figure 2:
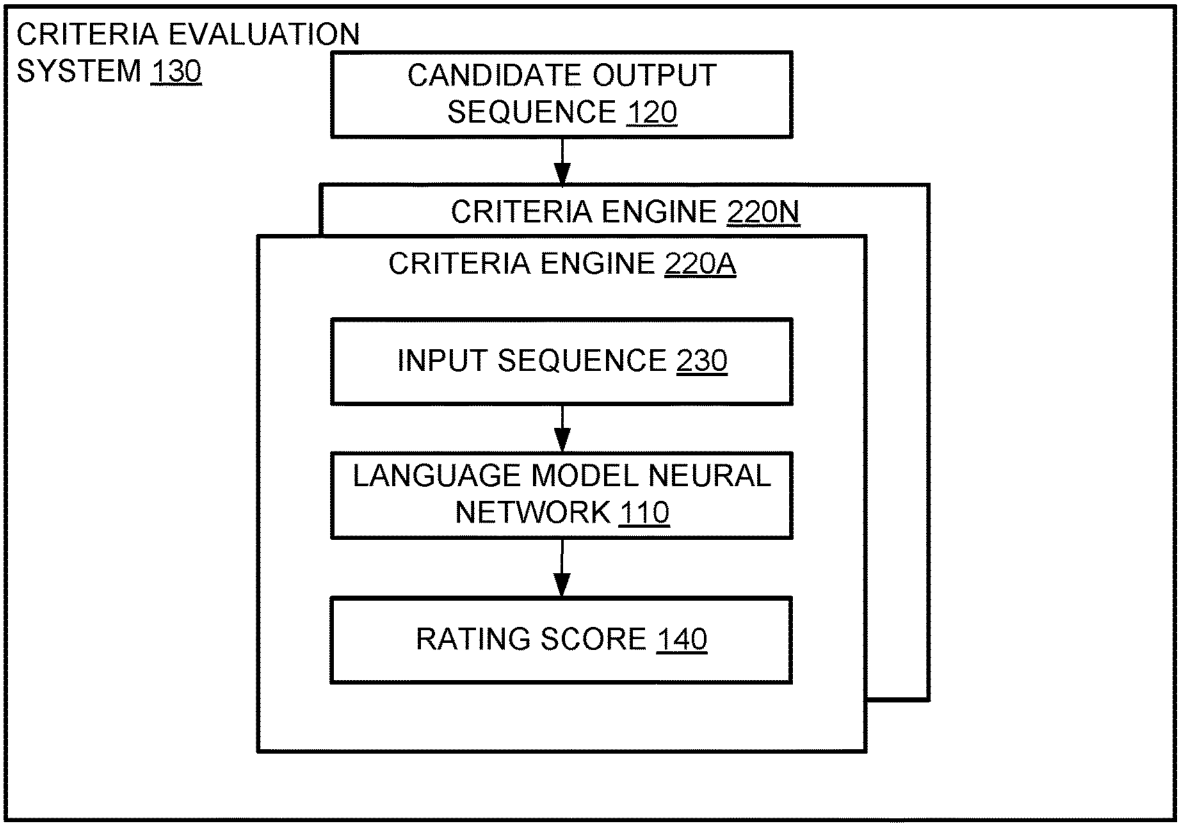
FIG. 2 is a diagram of one example of the criteria evaluation system.

FIG. 2 is a diagram of one example of the criteria evaluation system 130.

In the example of FIG. 2, the criteria evaluation system 130 includes a respective criteria engine 220A-N for each of the one or more criteria.

Each criteria engine 220A-N receives the candidate output sequence 120 and generates a rating score 140 for the corresponding criterion. The rating score 140 represents a degree to which the candidate output sequence 120 generated by the auto-regressive language model neural network 110 satisfies the criterion.

To generate the rating score 140, each criteria engine 220A-N receives the candidate output sequence 120 and generates an input sequence 230 based on the candidate output sequence 120 and a predetermined sequence of one or more tokens from the vocabulary that specify the criterion, i.e., a sequence of tokens that identifies, to the auto-regressive neural network 110, which criterion is being evaluated. More specifically, prior to using the neural network 110 to evaluate the one or more criteria, the system receives, as input, a respective sequence of tokens for each criterion. For example, the sequence of tokens can be a natural language name or other identifier for the corresponding criterion, e.g., the word "specificity" can represent the specificity criterion while the word "interestingness" can represent the interestingness criterion.

In particular, the input sequence 230 for a given criterion includes the candidate output sequence 120 followed by the one or more tokens that specify the output sequence criterion. When the system 100 also receives a context sequence 102, the input sequence 230 can also include the context sequence.

As a particular example, the input sequence 230 can be of the form:

<context><sentinel><response><attribute-name>, where "context" represents the context sequence 102, "sentinel" represents a predetermined sequence of tokens that indicates to the neural network 110 that a response to the context sequence 102 should be generated, "response" is the candidate output sequence 120, and "attribute-name" are the tokens specifying the criterion.

The system 130 then processes the input sequence 230 using the neural network 110 to generate a respective score for each of the tokens in the vocabulary. Since the neural network 110 has already processed the context sequence 102 to generate the candidate output sequence 120, this processing (also referred to as "evaluating the discriminator") simply involves processing the one or more additional tokens "<attribute-name>" appended after the candidate output sequence 120 while re-using hidden states generated during the generation of the candidate output sequence 120. This is in contrast to and significantly more computationally efficient than using a different neural network for evaluation of the criteria, i.e., because the different neural network would need to process all of the tokens in the context 102 and the candidate output sequence 120 in order to accurately score the candidate output sequence 102.

Thus, each engine 220A-N generates a different input sequence 230 and uses the neural network 110 to generate a corresponding score distribution over the vocabulary of tokens.

Each engine 220A-N then determines, from the respective scores for the tokens that are in a corresponding proper subset of the vocabulary of tokens, the rating score 140.

That is, each criterion has a corresponding proper subset of one or more tokens in the vocabulary.

When each rating score has the same range, the corresponding proper subsets can be the same.

When different rating scores have different ranges, the corresponding proper subsets can be different. For example, when the rating scores range from 0 to 1, the engine 220A-N can use the score for the token "1" as the rating score 140. More generally, the engine 220A-N the system can compute the rating score 140 as equal to a weighted sum of each possible ground truth value of the rating score, with the weight for each ground truth value being the score for the token representing the ground truth value in the vocabulary.

Thus, as shown in FIG. 2, the system 130 generates the rating scores 140 for the one or more criteria using the neural network 110 in a computationally efficient manner, i.e., because generating the rating scores 140 only requires the neural network 110 to process a few additional tokens per criterion.

Prior to using the neural network 110 to generate rating scores and after the neural network 110 was pre-trained, the system 130 or another training system fine-tunes the neural network 110 in order to cause the neural network 110 to accurately generate the rating scores, i.e., by repeatedly performing training steps on batches of training examples from a set of training data for the fine-tuning.

Each training example includes a training input sequence that includes a (i) training output sequence followed by (ii) one or more tokens that specify a particular criterion from the set of criteria. Each training example also includes a ground truth rating score for the corresponding output sequence criterion that represents a degree to which the training output sequence satisfies the particular output sequence criterion. The ground truth rating scores can be obtained, e.g., as a result of manual labeling of output sequences by users or as the output of another automatic labeling system.

To perform a training step, the system, i.e., the system 130 or another training system, obtains a batch of one or more training examples. For example, the system can sample the batch from a larger set of training examples for the fine-tuning training process.

For each training example in the batch, the system processes, using the auto-regressive language model neural network, the training input sequence in the training example to generate a respective score for each token in the vocabulary.

The system then trains the auto-regressive language model neural network to minimize a loss function that measures, for each training example in the batch, an error between (i) the respective scores for the tokens in the vocabulary generated for the training example and (ii) a ground truth set of scores for the tokens in the vocabulary that would yield the ground truth rating score for the training example. For example, the loss function can be a negative log likelihood loss or a cross-entropy loss.

In particular, the system can compute gradients of the loss function with respect to the parameters of the neural network 110, e.g., by backpropagation. The system can then update the parameters of the neural network 110 by applying an optimizer to the computed gradients to generate an update and then adding the update to or subtracting the update from the current values of the parameters.

The system can perform this fine-tuning in a computationally-efficient manner, because losses are only applied to the error measured by the loss function, i.e., only for the predicted rating scores, without applying losses for any predictions at any earlier positions in the training input sequences.

As described above, after the fine-tuning has been performed, the system 130 or another training system can also use the engines 210A-N to generate a filtered set of training data that is used to further fine-tune the neural network 110.

Figure 3:
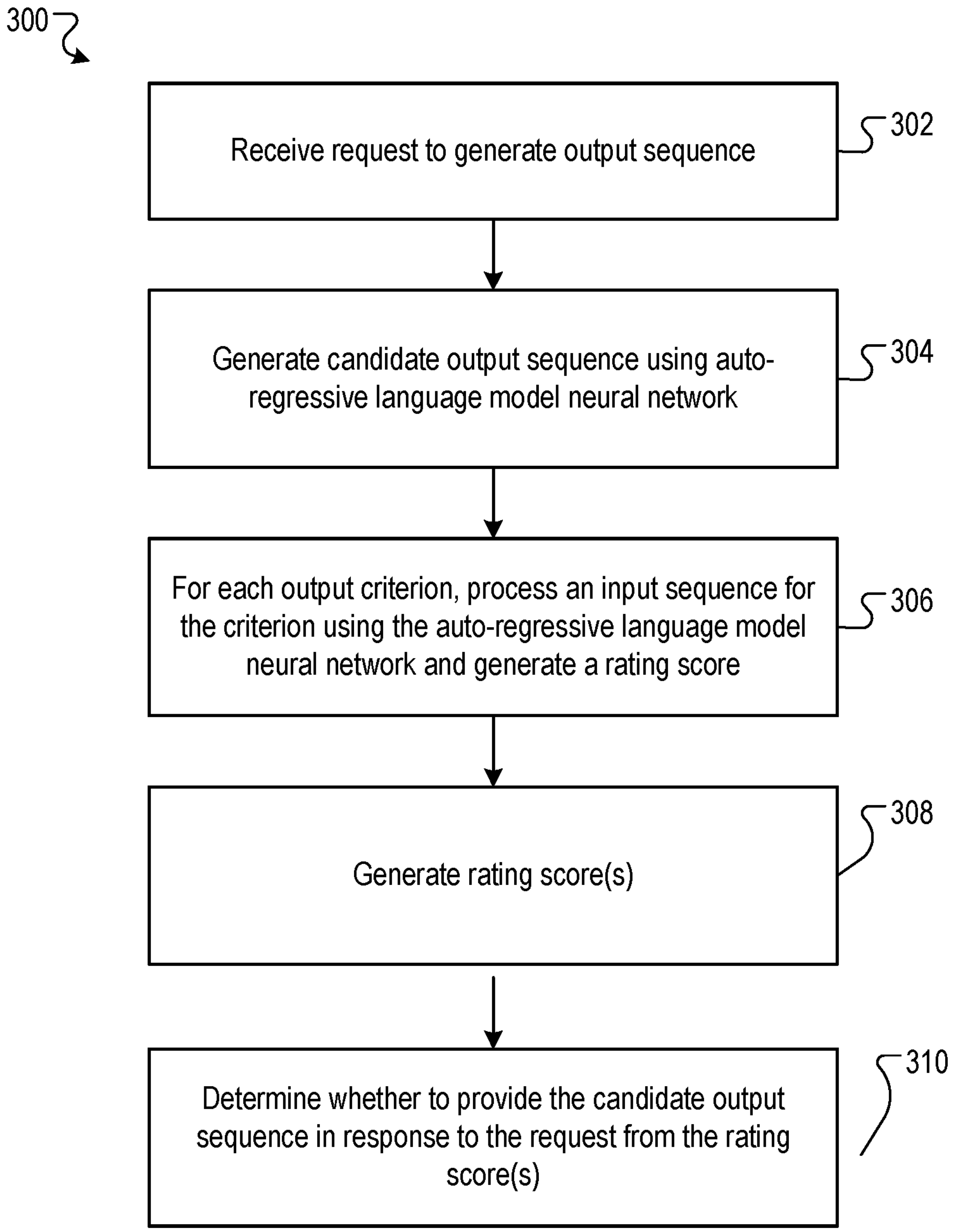
FIG. 3 is a flow diagram of an example process for evaluating a candidate output sequence.

FIG. 3 is a flow diagram of an example process 300 for evaluating a candidate output sequence. For convenience, the process 300 will be described as being performed by a system of one or more computers located in one or more locations. For example, a neural network system, e.g., the neural network system 100 depicted in FIG. 1, appropriately programmed in accordance with this specification, can perform the process 300.

The system receives a request for an output sequence (step 302). In some implementations, the request includes a context sequence and the request is for a response to the context sequence.

The system generates, using the auto-regressive language model neural network, a first candidate output sequence that includes a plurality of tokens that are each selected from a vocabulary of tokens (step 304). As described above, in some implementations, the system generates multiple candidate output sequences using the neural network, i.e., also generates one or more additional candidate output sequences in addition to the first candidate output sequence.

For each output sequence criterion in a set of one or more output sequence criteria, the system processes, using the auto-regressive language model neural network, an input sequence that includes (i) the first candidate output sequence followed by (ii) one or more tokens that specify the output sequence criterion to generate a respective score for each token in the vocabulary (step 306). When the request also specifies a conditioning sequence, the input sequence also includes the conditioning sequence.

For each output sequence criterion, the system determines, from the respective scores for the tokens that are in a corresponding proper subset of the vocabulary of tokens, a respective rating score for the first candidate output sequence that represents a degree to which the first candidate output sequence generated by the auto-regressive language model neural network satisfies the output sequence criterion (step 308).

The scores may be generated in parallel, for example by processing a plurality of input sequences that each comprise (i) the first candidate output sequence followed by (ii) one or more tokens that specify a respective output sequence criterion for the score using multiple copies of the auto-regressive language model neural network. Such parallelization may allow ratings scores to be determined more quickly, allowing output based on the candidate output sequence to be provided more rapidly.

When additional candidate output sequences have been generated, the system also performs steps 306 and 308 to generate respective rating scores for each of the additional candidate output sequences.

The system then determines whether to provide the first candidate output sequence in response to the request using the respective rating scores for the first candidate output sequence for the one or more output sequence criteria (step 310). For example, the system can make this determination as described above with reference to FIG. 1.

Figure 4:
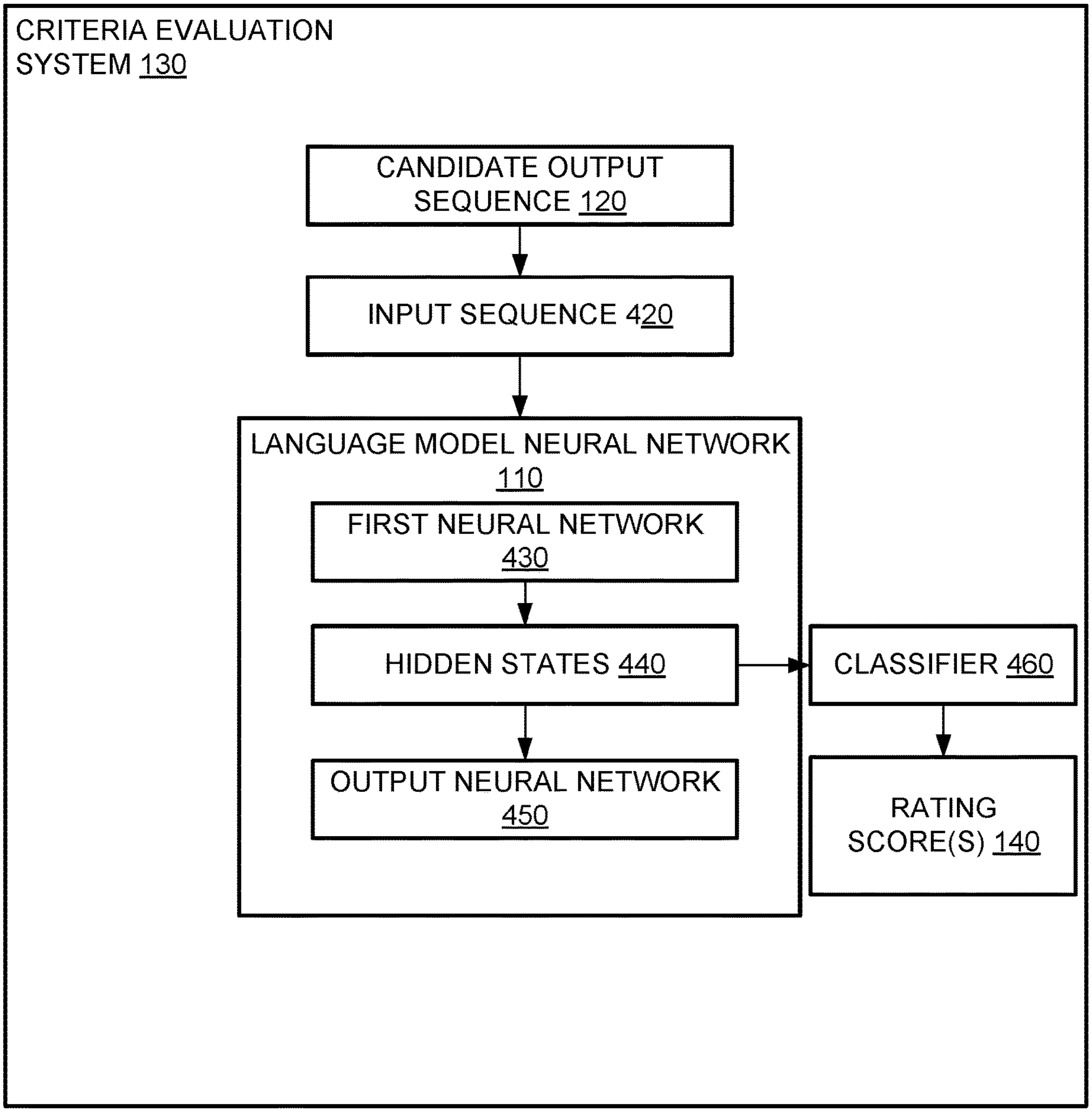
FIG. 4 is a diagram of another example of the criteria evaluation system.
Figure 5:
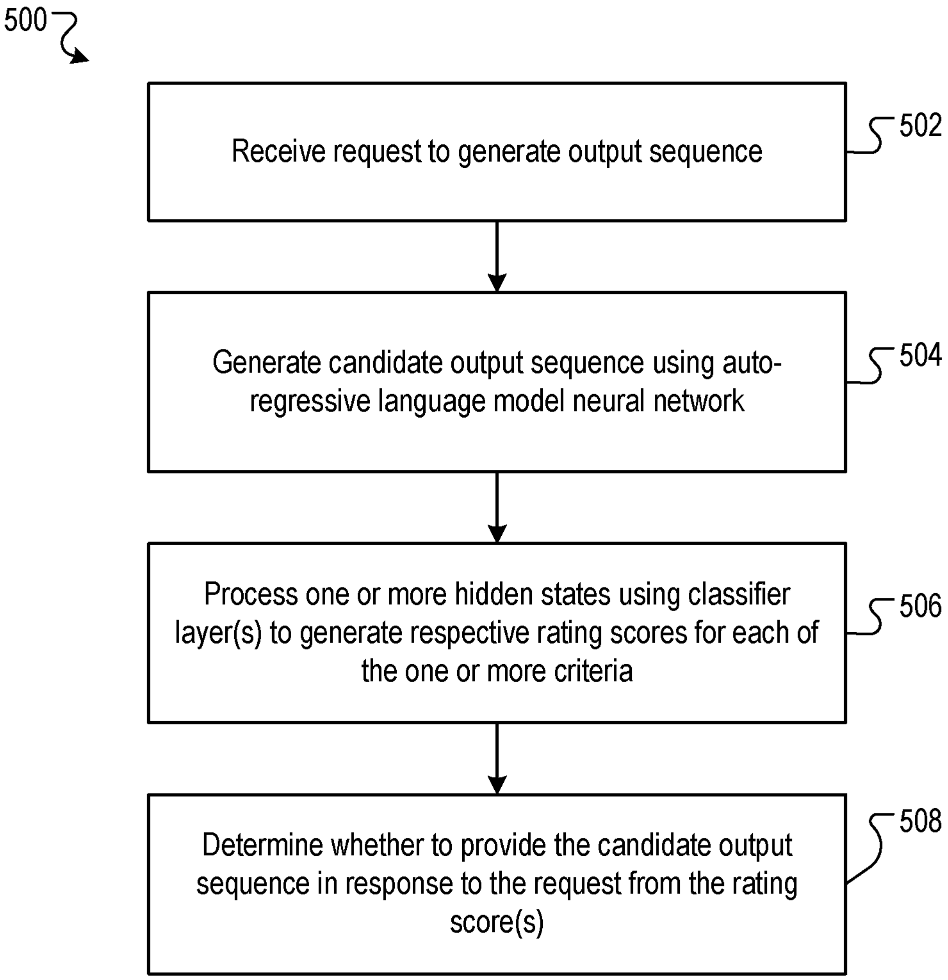
FIG. 5 is a flow diagram of another example process for evaluating a candidate output sequence.

FIG. 4 is a diagram of another example of the criteria evaluation system 130.

In the example of FIG. 4, the criteria evaluation system 130 includes a classifier 460 that generates the respective rating scores 140 for each of the one or more criteria.

In particular, as shown in FIG. 2, the language model neural network 110 includes a first subnetwork 430 and an output subnetwork 450.

The first subnetwork 430 is configured to process an input sequence that includes a plurality of input tokens to generate a respective hidden state 440 for each of the input tokens.

The output subnetwork 450 is configured to process the respective hidden state for the input token at the position immediately preceding the particular position to generate a respective score for each token in a vocabulary of tokens and select one of the tokens in the vocabulary as the token at the particular position in the first candidate output sequence using the respective scores.

For example, as described above, the neural network 110 can be a Transformer-based neural network that includes multiple attention blocks that each apply a self-attention mechanism. More specifically, in this example, the Transformer-based neural network includes a sequence of attention blocks, and, during the processing of a given input sequence, each attention block in the sequence receives a respective input hidden state for each input token in the given input sequence and updates each of the hidden states at least in part by applying self-attention to generate a respective output hidden state for each of the input tokens. The input hidden states for the first attention block are embeddings of the input tokens and the input hidden states for each subsequent attention block are the output hidden states generated by the preceding attention block.

In this example, the attention blocks are part of the first subnetwork 410 and the hidden states 440 are the output hidden states generated by the last attention block in the sequence.

The output subnetwork 450 can include, e.g., one or more fully-connected layers, that process the hidden state 440 for the last input token in the input sequence to generate a respective score for each token in a vocabulary of tokens. As a particular example, the output subnetwork 450 can include one or more linear neural network layers followed by a softmax output layer.

In the example of FIG. 4, to generate the rating scores 140, the system 130 processes an input sequence 420 using the first subnetwork 430 to generate a respective hidden state 440 for each input in the input sequence 420.

In particular, the input sequence 420 includes a plurality of input tokens that include all of the tokens at all of the positions in the candidate output sequence 120. That is, the input sequence 420 includes the entire candidate output sequence 120. When the system 100 also receives the context sequence 102, the input tokens also include the tokens from the context sequence 102.

For example, the input sequence 420 can be of the form:

<context><sentinel><response>, where "context" represents the context sequence 102, "sentinel" represents a predetermined sequence of tokens that indicates to the neural network 110 that a response to the context sequence 102 should be generated, and "response" is the candidate output sequence 120.

For many auto-regressive neural networks 110 that generate variable length output sequences, a given output sequence is terminated when a predetermined end of sequence token is selected at a given time step. That is, once the end of sequence token is selected, the system 100 determines the output sequence to be the tokens at time steps preceding the given time step during the generation of the output sequence. In these implementations, the system 130 does not need to perform any additional processing in order to generate the hidden states for the input sequence 410, i.e., because the input sequence 410 was already processed in order to select the end of sequence token that ended the generation of the candidate output sequence 120.

The system 130 then processes one or more of the hidden states 440 using the classifier 460 to generate a respective rating score 140 for each of the one or more criteria. For example, the one or more hidden states 440 that are processed by the classifier 460 can be the respective hidden state generated by the first subnetwork for the token at the last position in the first candidate output sequence. As another example, the one or more hidden states 440 that are processed by the classifier 460 can be the respective hidden state generated by the first subnetwork 430 for a designated input token at a designated position among the input tokens, e.g., the first input token in the input sequence. As yet another example, the one or more hidden states 440 can include all of the hidden states 440 and the classifier 460 can be configured to average the hidden states 440.

The classifier 460 is a neural network that includes one or more classifier layers and that is configured to process the one or more hidden states using the one or more classifier layers to generate a respective rating score 140 for each of the one or more criteria. For example, the classifier layers can include one or more fully-connected layers, with the last layer having a respective node, e.g., a logistic regression or sigmoid node, corresponding to each of the criteria, with each node being configured to generate the respective rating score 140 for the corresponding criterion.

Thus, in the example of FIG. 4, the system 130 can generate scores for all of the criteria by processing a hidden state (that was already generated as part of generating the candidate output sequence) using a small, computationally efficient classifier 460.

Prior to using the classifier 460 to generate rating scores and after the neural network 110 was pre-trained, the system 130 or another training system trains the classifier 460 in order to cause the classifier 460 to accurately generate the rating scores, i.e., by repeatedly performing training steps on batches of training examples from a set of training data for the training.

To perform a training step, the system, i.e., the system 130 or another training system, obtains a batch of one or more training examples. For example, the system 130 can sample the batch from a larger set of training examples for the fine-tuning training process.

For each training example in the batch, the system processes one or more of the respective hidden states generated by the first subnetwork by processing an input that includes a plurality of input tokens that include all of the tokens at all of the positions in the training output sequence in the training example using the one or more classifier layers to generate a respective rating score for each output sequence criterion.

The system then trains the one or more classifier layers to minimize a loss function that measures, for each training example in the batch, an error between (i) the respective rating scores generated for the training example and (ii) the respective ground truth rating scores for the training example.

In particular, the system can compute gradients of the loss function with respect to the parameters of the classifier layers. The system can then update the parameters of the classifier layers by applying an optimizer to the computed gradients to generate an update and then adding the update to or subtracting the update from the current values of the parameters.

The system can perform this training in a computationally efficient manner because the classifier 460 has relatively few parameters, i.e., relative to the neural network 110, and the system holds the input subnetwork frozen during the training of the classifier 460.

As described above, after the training of the classifier 460 has been performed, the system 130 or another training system can also use the classifier 460 to generate a filtered set of training data that is used to further fine-tune the neural network 110.

FIG. 3 is a flow diagram of another example process 500 for evaluating a candidate output sequence. For convenience, the process 500 will be described as being performed by a system of one or more computers located in one or more locations. For example, a neural network system, e.g., the neural network system 100 depicted in FIG. 1, appropriately programmed in accordance with this specification, can perform the process 500.

The system receives a request for an output sequence (step 502). In some implementations, the request includes a context sequence and the request is for a response to the context sequence.

The system generates, using the auto-regressive language model neural network, a first candidate output sequence that includes a plurality of tokens that are each selected from a vocabulary of tokens (step 504).

As described above, the language model neural network includes a first subnetwork and an output subnetwork.

The first subnetwork is configured to, at each particular position of the plurality of positions in the candidate output sequence, process an input comprising a plurality of input tokens to generate a respective hidden state for each of the input tokens, the input tokens comprising the tokens at each position preceding the particular position in the candidate output sequence and, optionally, the tokens in the context sequence.

The output subnetwork is configured to, at each particular position of the plurality of positions, process the respective hidden state for the input token at the position immediately preceding the particular position to generate a respective score for each token in a vocabulary of tokens; and select one of the tokens in the vocabulary as the token at the particular position in the first candidate output sequence using the respective scores.

As described above, in some implementations, the system generates multiple candidate output sequences using the neural network, i.e., also generates one or more additional candidate output sequences in addition to the first candidate output sequence.

The system processes one or more of the respective hidden states that were generated by the first subnetwork by processing an input that includes all of the tokens at all of the positions in the first candidate output sequence using one or more classifier layers to generate a respective rating score for each criterion in a set of one or more criteria (step 506).

When additional candidate output sequences have been generated, the system also performs step 506 to generate respective rating scores for each of the additional candidate output sequences.

The system then determines whether to provide the first candidate output sequence in response to the request using the respective rating scores for the first candidate output sequence for the one or more output sequence criteria (step

508). For example, the system can make this determination as described above with reference to FIG. 1.

An "embedding," as used in this specification is a vector of numeric values, e.g., floating point or other type of numeric values, that has a predetermined dimensionality, e.g., has a predetermined number of values.

A self-attention block, as referred to above, is a neural network layer that includes an attention mechanism that operates over the self-attention block input (or an input derived from the layer input) to generate the self-attention block output. A self-attention mechanism may be causally masked so that any given position in an input sequence does not attend over (e.g., use data from) any positions after the given position in the input sequence. There are many different possible attention mechanisms. Some examples of self-attention layers including attention mechanisms, are described in Vaswani et al. "Attention is all you need", 31st Conference on Neural Information Processing Systems (NIPS 2017), Long Beach, CA, USA; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv:1910.10683, 2019; Daniel Adiwardana, Minh-Thang Luong, David R. So, Jamie Hall, Noah Fiedel, Romal Thoppilan, Zi Yang, Apoory Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv:2005.14165, 2020.

Generally, an attention mechanism maps a query and a set of key-value pairs to an output, where the query, keys, and values are all vectors. The output is computed as a weighted sum of the values, where the weight assigned to each value is computed by a compatibility function, e.g., a dot product or scaled dot product, of the query with the corresponding key.

Generally, a self-attention mechanism is configured to relate different positions in the same sequence to determine a transformed version of the sequence as an output. For example the attention layer input may comprise a vector for each element of the input sequence. These vectors provide an input to the self-attention mechanism and are used by the self-attention mechanism to determine a new representation of the same sequence for the attention layer output, which similarly comprises a vector for each element of the input sequence. An output of the self-attention mechanism may be used as the attention layer output, or it may be processed by one or more of feed-forward layers, skip connections, or normalization operations to provide the attention layer output.

In some implementations the attention mechanism is configured to apply each of a query transformation, e.g., defined by a matrix $W^Q$, a key transformation, e.g., defined by a matrix $W^K$, and a value transformation, e.g., defined by a matrix $W^V$, to the attention layer input which is the input data X to the attention layer, to derive a query matrix $Q=XW^Q$ that includes a respective query for each vector in the input sequence, key matrix $K=XW^K$ that includes a respective key for each vector in the input sequence, and value matrix $V=XW^V$ that includes a respective value for each vector in the input sequence, which are used determine an attended sequence for the output. For example the attention mechanism may be a dot product attention mechanism applied by applying each query vector to each key vector to determine respective weights for each value vector, then combining the value vectors using the respective weights to determine the self-attention layer output for each element of the input sequence. The self-attention layer output may be scaled by a scaling factor, e.g., by the square root of the dimensions of the queries and keys, to implement scaled dot product attention. Thus, for example, an output of the attention mechanism may be determined as $$softmax\left(\frac{QK^T}{\sqrt{d}}\right)V$$

where d is a dimension of the key (and value) vector. In another implementation the attention mechanism be comprise an "additive attention" mechanism that computes the compatibility function using a feed-forward network with a hidden layer. The output of the attention mechanism may be further processed by one or more fully-connected, feed forward neural network layers.

The attention mechanism may implement multi-head attention, that is, it may apply multiple different attention mechanisms in parallel. The outputs of these may then be combined, e.g., concatenated, with a learned linear transformation applied to reduce to the original dimensionality if necessary.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving a request for an output sequence through a dialog system;

processing an input sequence according to the request to generate, using an auto-regressive language model neural network, a first candidate output sequence, wherein the first candidate output sequence comprises a plurality of tokens that are each selected from a vocabulary of tokens, wherein the auto-regressive language model neural network includes (i) a sequence of attention blocks, each attention block of the sequence of attention blocks including one or more network layers configured to generate hidden states for the plurality of tokens in the first candidate output sequence, the generation comprising applying a self-attention mechanism to process the input sequence, and (ii) an output subnetwork configured to process an output of a last attention block of the sequence of attention blocks to generate a respective score for each token of the vocabulary of tokens;

for each output sequence criterion in a set of one or more output sequence criteria:

processing, using the auto-regressive language model neural network, a new input sequence comprising (i) the first candidate output sequence followed by (ii) a sequence of tokens of the vocabulary of tokens that specify the output sequence criterion to generate a respective new score for each token in the vocabulary of tokens, wherein the sequence of tokens of the vocabulary of tokens that specify the output sequence criterion comprises multiple tokens representing a natural language description of the output sequence criterion, wherein the output sequence criterion measures a respective property of the first candidate output sequence, and wherein generating the respective new scores comprises:

processing the sequence of tokens of the vocabulary of tokens using corresponding attention blocks of the sequence of attention blocks, the processing comprising: for each of the one or more network layers in the corresponding attention blocks, re-using the hidden states generated as output by the network layer for the plurality of tokens in the first candidate output sequence, without processing the plurality of tokens in the first candidate output sequence using the network layer, to generate the respective new score for each token in the vocabulary of tokens;

identifying a subset of the vocabulary of tokens for the output sequence criterion; and determining, from the respective new scores for tokens that are in the subset of the vocabulary of tokens, a respective rating score for the first candidate output sequence that represents a degree to which the first candidate output sequence generated by the auto-regressive language model neural network satisfies the output sequence criterion; and displaying, on a user interface associated with the dialog system, the first candidate output sequence as an output from the dialog system corresponding to the request based on the respective rating scores determined for the first candidate output sequence with respect to the one or more output sequence criteria.

2. The method of claim 1, wherein the request is for an output sequence that follows a context sequence, wherein generating the first candidate output sequence comprises conditioning the auto-regressive language model neural network on an input comprising the context sequence, and wherein the new input sequence that comprises (i) the first candidate output sequence followed by (ii) the sequence of tokens of the vocabulary of tokens that specify the output sequence criterion further comprises the context sequence.

3. The method of claim 1, further comprising:

generating, using the auto-regressive language model neural network, one or more additional candidate output sequences;

for each additional candidate output sequence:

for each output sequence criterion in the set of one or more output sequence criteria:

processing an input sequence comprising (i) the additional candidate output sequence followed by (ii) the sequence of tokens of the vocabulary of tokens that specify the output sequence criterion using the auto-regressive language model neural network to generate an additional respective score for each token in the vocabulary of tokens; and determining, from the additional respective scores for tokens in the subset of the vocabulary of tokens, a respective rating score for the additional candidate output sequence, the respective rating score representing a degree to which the additional candidate output sequence generated by the autoregressive language model neural network satisfies the output sequence criterion; and wherein providing the first candidate output sequence in response to the request using the one or more respective rating scores for the one or more output sequence criteria comprises:

selecting, from among the first candidate output sequence and the one or more additional candidate output sequences, a sequence to be provided in response to the request using the one or more respective rating scores for the first candidate output sequence and the one or more additional respective rating scores for the one or more additional candidate output sequences.

4. The method of claim 3, wherein selecting, from among the first candidate output sequence and the one or more additional candidate output sequences, the sequence to be provided in response to the request using the one or more respective rating scores for the first candidate output sequence and the one or more additional candidate output sequences comprises:

generating, for each of the first candidate output sequence and the one or more additional candidate output sequences, a respective quality score from the one or more respective rating scores for the candidate output sequence for each of the one or more output sequence criteria in the set; and selecting, as the sequence to be provided in response to the request, a candidate output sequence with a highest respective quality score.

5. The method of claim 1, wherein providing the first candidate output sequence in response to the request using the one or more respective rating scores for the one or more output sequence criteria comprises:

determining whether a respective rating score for the first candidate output sequence for a first output criterion in the set satisfies a threshold; and determining not to provide the first candidate output sequence in response to the request when the respective rating score for the first candidate output sequence for the first output criterion in the set does not satisfy the threshold.

6. The method of claim 1, further comprising training the auto-regressive language model neural network, the training comprising:

obtaining a batch of one or more training examples, each training example comprising:

a training input sequence comprising (i) a training output sequence followed by (ii) a sequence of tokens of the vocabulary of tokens that specify a particular output sequence criterion from the set of one or more output sequence criteria, and a ground truth rating score for the particular output sequence criterion that represents a degree to which the training output sequence satisfies the particular output sequence criterion;

for each training example in the batch:

processing, using the auto-regressive language model neural network, the training input sequence in the training example to generate a respective score for each token in the vocabulary of tokens; and training the auto-regressive language model neural network to minimize a loss function that measures, for each training example in the batch, an error between (i) the respective scores for the tokens in the vocabulary of tokens generated for the training example and (ii) a ground truth set of scores for the tokens in the vocabulary of tokens that would yield the ground truth rating score for the training example.

7. The method of claim 6, wherein training the auto-regressive language model neural network to minimize the loss function comprises:

only applying losses to the error without applying losses to errors at any earlier positions in the training input sequences.

8. The method of claim 6, further comprising, prior to training the auto-regressive language model neural network to minimize the loss function, training the auto-regressive language model neural network on a language modeling task that requires predicting a next token in a sequence of tokens given preceding tokens in the sequence of tokens.

9. The method of claim 2, wherein the context sequence is a text sequence.

10. The method of claim 1, wherein an output sequence criterion of the set of one or more output sequence criteria measures a level of sensibleness, specificity, interestingness, or suitability of the first candidate output sequence.

11. A system comprising:

one or more computers; and one or more storage devices storing instructions that, when executed by the one or more computers, cause the one or more computers to perform operations comprising:

receiving a request for an output sequence through a dialog system;

processing an input sequence according to the request to generate, using an auto-regressive language model neural network, a first candidate output sequence, wherein the first candidate output sequence comprises a plurality of tokens that are each selected from a vocabulary of tokens, wherein the auto-regressive language model neural network includes (i) a sequence of attention blocks, each attention block of the sequence of attention blocks including one or more network layers configured to generate hidden states for the plurality of tokens in the first candidate output sequence, the generation comprising applying a self-attention mechanism to process the input sequence, and (ii) an output subnetwork configured to process an output of a last attention block of the sequence of attention blocks to generate a respective score for each token of the vocabulary of tokens;

for each output sequence criterion in a set of one or more output sequence criteria:

processing, using the auto-regressive language model neural network, a new input sequence comprising (i) the first candidate output sequence followed by (ii) a sequence of tokens of the vocabulary of tokens that specify the output sequence criterion to generate a respective new score for each token in the vocabulary of tokens, wherein the sequence of tokens of the vocabulary of tokens that specify the output sequence criterion comprises multiple tokens representing a natural language description of the output sequence criterion, wherein the output sequence criterion measures a respective property of the entire first candidate output sequence, and wherein generating the respective new scores comprises:

processing the sequence of tokens of the vocabulary of tokens using corresponding attention blocks of the sequence of attention blocks, the processing comprising: for each of the one or more network layers in the corresponding attention blocks, re-using the hidden states generated as output by the network layer for the plurality of tokens in the first candidate output sequence, without processing the plurality of tokens in the first candidate output sequence using the network layer, to generate the respective new score for each token in the vocabulary of tokens;

identifying a subset of the vocabulary of tokens for the output sequence criterion; and determining, from the respective new scores for tokens that are in the subset of the vocabulary of tokens, a respective rating score for the first candidate output sequence that represents a degree to which the first candidate output sequence generated by the auto-regressive language model neural network satisfies the output sequence criterion; and displaying, on a user interface associated with the dialog system, the first candidate output sequence as an output from the dialog system corresponding to the request based on the respective rating scores determined for the first candidate output sequence with respect to the one or more output sequence criteria.

12. The system of claim 11, wherein the request is for an output sequence that follows a context sequence, wherein generating the first candidate output sequence comprises conditioning the auto-regressive language model neural network on an input comprising the context sequence, and wherein the new input sequence that comprises (i) the first candidate output sequence followed by (ii) the sequence of tokens of the vocabulary of tokens that specify the output sequence criterion further comprises the context sequence.

13. The system of claim 11, the operations further comprising:

generating, using the auto-regressive language model neural network, one or more additional candidate output sequences;

for each additional candidate output sequence:

for each output sequence criterion in the set of one or more output sequence criteria:

processing an input sequence comprising (i) the additional candidate output sequence followed by (ii) the sequence of tokens of the vocabulary of tokens that specify the output sequence criterion using the auto-regressive language model neural network to generate an additional respective score for each token in the vocabulary of tokens; and determining, from the additional respective scores for tokens in the subset of the vocabulary of tokens, a respective rating score for the additional candidate output sequence, the respective rating score representing a degree to which the additional candidate output sequence generated by the auto-regressive language model neural network satisfies the output sequence criterion; and wherein providing the first candidate output sequence in response to the request using the one or more respective rating scores for the one or more output sequence criteria comprises:

selecting, from among the first candidate output sequence and the one or more additional candidate output sequences, a sequence to be provided in response to the request using the one or more respective rating scores for the first candidate output sequence and the one or more additional respective rating scores for the one or more additional candidate output sequences.

14. The system of claim 13, wherein selecting, from among the first candidate output sequence and the one or more additional candidate output sequences, the sequence to be provided in response to the request using the one or more respective rating scores for the first candidate output sequence and the one or more additional candidate output sequences comprises:

generating, for each of the first candidate output sequence and the one or more additional candidate output sequences, a respective quality score from the one or more respective rating scores for the candidate output sequence for each of the one or more output sequence criteria in the set; and selecting, as the sequence to be provided in response to the request, a candidate output sequence with a highest respective quality score.

15. The system of claim 11, wherein providing the first candidate output sequence in response to the request using the one or more respective rating scores for the one or more output sequence criteria comprises:

determining whether a respective rating score for the first candidate output sequence for a first output criterion in the set satisfies a threshold; and determining not to provide the first candidate output sequence in response to the request when the respective rating score for the first candidate output sequence for the first output criterion in the set does not satisfy the threshold.

16. The system of claim 11, further comprising training the auto-regressive language model neural network, the training comprising:

obtaining a batch of one or more training examples, each training example comprising:

a training input sequence comprising (i) a training output sequence followed by (ii) a sequence of tokens of the vocabulary of tokens that specify a particular output sequence criterion from the set of one or more output sequence criteria, and a ground truth rating score for the particular output sequence criterion that represents a degree to which the training output sequence satisfies the particular output sequence criterion;

for each training example in the batch:

processing, using the auto-regressive language model neural network, the training input sequence in the training example to generate a respective score for each token in the vocabulary of tokens; and training the auto-regressive language model neural network to minimize a loss function that measures, for each training example in the batch, an error between (i) the respective scores for the tokens in the vocabulary of tokens generated for the training example and (ii) a ground truth set of scores for the tokens in the vocabulary of tokens that would yield the ground truth rating score for the training example.

17. The system of claim 16, wherein training the auto-regressive language model neural network to minimize the loss function comprises:

only applying losses to the error without applying losses to errors at any earlier positions in the training input sequences.

18. The system of claim 16, further comprising, prior to training the auto-regressive language model neural network to minimize the loss function, training the auto-regressive language model neural network on a language modeling task that requires predicting a next token in a sequence of tokens given preceding tokens in the sequence of tokens.

19. The system of claim 12, wherein the context sequence is a text sequence.

20. One or more non-transitory computer storage media encoded with computer program instructions that when executed by one or more computers cause the one or more computers to perform operations comprising:

receiving a request for an output sequence through a dialog system;

processing an input sequence according to the request to generate, using an auto-regressive language model neural network, a first candidate output sequence, wherein the first candidate output sequence comprises a plurality of tokens that are each selected from a vocabulary of tokens, wherein the auto-regressive language model neural network includes (i) a sequence of attention blocks, each attention block of the sequence of attention blocks including one or more network layers configured to generate hidden states for the plurality of tokens in the first candidate output sequence, the generation comprising applying a self-attention mechanism to process the input sequence, and (ii) an output subnetwork configured to process an output of a last attention block of the sequence of attention blocks to generate a respective score for each token of the vocabulary of tokens;

for each output sequence criterion in a set of one or more output sequence criteria:

processing, using the auto-regressive language model neural network, a new input sequence comprising (i) the first candidate output sequence followed by (ii) a sequence of tokens of the vocabulary of tokens that specify the output sequence criterion to generate a respective new score for each token in the vocabulary of tokens, wherein the sequence of tokens of the vocabulary of tokens that specify the output sequence criterion comprises multiple tokens representing a natural language description of the output sequence criterion, wherein the output sequence criterion measures a respective property of the entire first candidate output sequence, and wherein generating the respective new scores comprises:

processing the sequence of tokens of the vocabulary of tokens using corresponding attention blocks of the sequence of attention blocks, the processing comprising: for each of the one or more network layers in the corresponding attention blocks, re-using the hidden states generated as output by the network layer for the plurality of tokens in the first candidate output sequence, without processing the plurality of tokens in the first candidate output sequence using the network layer, to generate the respective new score for each token in the vocabulary of tokens;

identifying a subset of the vocabulary of tokens for the output sequence criterion; and determining, from the respective new scores for tokens that are in the subset of the vocabulary of tokens, a respective rating score for the first candidate output sequence that represents a degree to which the first candidate output sequence generated by the auto-regressive language model neural network satisfies the output sequence criterion; and displaying, on a user interface associated with the dialog system, the first candidate output sequence as an output from the dialog system corresponding to the request based on the respective rating scores determined for the first candidate output sequence with respect to the one or more output sequence criteria.

21. The one or more non-transitory computer storage media of claim 20, wherein the request is for an output sequence that follows a context sequence, wherein generating the first candidate output sequence comprises conditioning the auto-regressive language model neural network on an input comprising the context sequence, and wherein the new input sequence that comprises (i) the first candidate output sequence followed by (ii) the sequence of tokens of the vocabulary of tokens that specify the output sequence criterion further comprises the context sequence.

* * * * *